United States Patent
Blinn

(10) Patent No.: US 7,925,786 B2
(45) Date of Patent: Apr. 12, 2011

(54) HOSTING OF NETWORK-BASED SERVICES

(75) Inventor: Arnold Blinn, Bellevue, WA (US)

(73) Assignee: Microsoft Corp., Redmond, WA (US)

( * ) Notice: Subject to any disclaimer, the term of this patent is extended or adjusted under 35 U.S.C. 154(b) by 1325 days.

(21) Appl. No.: 11/229,083

(22) Filed: Sep. 16, 2005

(65) Prior Publication Data

US 2007/0067457 A1 Mar. 22, 2007

(51) Int. Cl.
*G06F 15/16* (2006.01)
(52) U.S. Cl. .......................... 709/245; 709/219
(58) Field of Classification Search .................... 705/14, 705/40; 709/203–245; 707/1; 713/168
See application file for complete search history.

(56) References Cited

U.S. PATENT DOCUMENTS

| | | | | |
|---|---|---|---|---|
| 5,948,061 | A * | 9/1999 | Merriman et al. | 709/219 |
| 6,119,152 | A * | 9/2000 | Carlin et al. | 709/217 |
| 6,119,234 | A | 9/2000 | Aziz | |
| 6,182,131 | B1 | 1/2001 | Dean | |
| 6,249,873 | B1 | 6/2001 | Richard | |
| 6,301,609 | B1 | 10/2001 | Aravamudan | |
| 6,374,292 | B1 | 4/2002 | Srivastava | |
| 6,449,657 | B2 * | 9/2002 | Stanbach et al. | 709/245 |
| 6,718,387 | B1 * | 4/2004 | Gupta et al. | 709/226 |
| 6,895,431 | B1 | 5/2005 | Bero | |
| 6,912,564 | B1 | 6/2005 | Appelman | |
| 7,089,325 | B1 | 8/2006 | Murtza | |
| 7,130,878 | B2 | 10/2006 | Parsons | |
| 7,136,869 | B2 * | 11/2006 | Holcombe et al. | 707/103 R |
| 7,321,969 | B2 | 1/2008 | Schoen | |
| 7,330,971 | B1 | 2/2008 | Kukreja | |
| 2001/0043595 | A1 | 11/2001 | Aravamudan | |
| 2002/0007398 | A1 | 1/2002 | Mendiola | |
| 2003/0163730 | A1 | 8/2003 | Roskind | |
| 2003/0172145 | A1 | 9/2003 | Nguyen | |
| 2004/0003251 | A1 | 1/2004 | Narin | |
| 2004/0030887 | A1 | 2/2004 | Harrisville-Wolff | |
| 2004/0059712 | A1 * | 3/2004 | Dean et al. | 707/1 |
| 2004/0172456 | A1 | 9/2004 | Green | |
| 2004/0186838 | A1 * | 9/2004 | Johnson | 707/10 |
| 2004/0250119 | A1 * | 12/2004 | Shelest et al. | 713/201 |
| 2004/0250129 | A1 | 12/2004 | Clough | |
| 2005/0071741 | A1 * | 3/2005 | Acharya et al. | 715/500 |
| 2005/0192899 | A1 * | 9/2005 | Reardon | 705/40 |
| 2005/0198386 | A1 | 9/2005 | Accapadi | |
| 2005/0216587 | A1 | 9/2005 | John | |
| 2005/0286531 | A1 * | 12/2005 | Tuohino et al. | 370/395.2 |
| 2005/0289084 | A1 | 12/2005 | Thayer | |

(Continued)

OTHER PUBLICATIONS

Andy Koopsman, et al, "Microsoft® Exchange 2000 Server Resource Kit", Aug. 30, 2000, Microsoft Press, Part 5: Chapter 19.—Instant Messaging Overview.

(Continued)

*Primary Examiner* — Bunjob Jaroenchonwanit
(74) *Attorney, Agent, or Firm* — Shook, Hardy & Bacon

(57) ABSTRACT

A system, a method and computer-readable media for hosting network-based services for a domain name. Authorization is obtained to host services for the domain name. This authorization may originate from an entity in control of the domain. The authorized network-based services are provided to users of the domain in interfaces that present advertising content to the users. Advertising revenue is generated in connection with this presentation of advertising content, and a portion of the advertising revenue is allocated for distribution to the entity in control of the domain.

18 Claims, 4 Drawing Sheets

U.S. PATENT DOCUMENTS

| | | | |
|---|---|---|---|
| 2006/0026237 A1* | 2/2006 | Wang et al. | 709/206 |
| 2006/0095586 A1* | 5/2006 | Adelman et al. | 709/245 |
| 2006/0101113 A1* | 5/2006 | Lemson et al. | 709/203 |
| 2006/0129644 A1* | 6/2006 | Owen et al. | 709/206 |
| 2006/0174018 A1 | 8/2006 | Zhu | |
| 2006/0174033 A1* | 8/2006 | Gillum et al. | 709/238 |
| 2006/0179113 A1* | 8/2006 | Buckingham et al. | 709/206 |
| 2006/0218303 A1 | 9/2006 | Adelman | |
| 2006/0265508 A1* | 11/2006 | Angel et al. | 709/230 |
| 2006/0265589 A1* | 11/2006 | Murtza et al. | 713/168 |
| 2007/0073660 A1* | 3/2007 | Quinlan | 707/3 |
| 2007/0078936 A1* | 4/2007 | Quinlan et al. | 709/206 |
| 2007/0112627 A1* | 5/2007 | Jacobs et al. | 705/14 |

OTHER PUBLICATIONS

Duncan MacKenzie and Joel Semeniuk, "Exchange & Outlook®: Constructing Collaborative Solutions", Jun. 2000, David Dwyer, First Edition, Part III: Appendix C.—Instant Messaging Services.

Microsoft Active Directory and Active Directory Services Interfaces, TechNET Website; under Windows NT 4.0; Active Directory—Download link, 2 pages, 1998.

J.B. Postel, "Simple Mail Transfer Protocol," RFC 821, Information Sciences Institute, University of Southern California, Aug. 1982.

J. Myers, "Post Office Protocol—Version 3," RFC 1939, Carnegie Mellon, May 1996.

Y. Rekhter, "Interaction Between DHCP and DNW," Internet Draft, draft-ietf-dhc-dhcp-dns-04.tx, May 1997.

P. Mockapetris, "Domain Names-Implementation and Specification," RFC 1035, Information Science Institute, University of Southern California, Nov. 1987.

ICANN Policy on Transfer of Registrations between Registrars, Jul. 12, 2004, http://www.icann.org/en/transfers/policy-12jul04.htm, pp. 1-3.

* cited by examiner

HOSTING OF NETWORK-BASED SERVICES

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

The Internet has become a ubiquitous source of information and resources, allowing millions of people around the world to easily exchange information and communications. For example, web sites accessible over the Internet often provide a wide variety of information and content. By publishing content on a web site, authors can share their works with audiences around the world, while retailers can introduce their products to countless potential new customers. Internet users can also exchange electronic communications in the form of e-mail, instant messages and other types of messages. These communications are facilitated by communication servers, which are able to send and receive messages over the Internet.

Each device connected to the Internet must have at least one Internet protocol (IP) address. For example, a server hosting a web site or an Internet communication service must have an IP address. An example IP address is 12.10.38.33. An IP address is a unique number, similar in concept to a telephone number, used by devices to refer to each other when sending information through the Internet. This allows machines passing the information onwards on behalf of the sender to know the intended destination.

IP addresses, however, are difficult to remember and are not descriptive of the Internet locations to which they correspond, Accordingly, IP addresses may be associated with a domain name that may be used instead of an IP address to direct traffic to a network location. Domain names are much easier to remember and use than their corresponding IP addresses. For example, instead of using various IP addresses to refer to various locations in a company's network, the company may purchase the domain name "company.com." In this case, the company's website may reside at www.company.com, while employees of the company may be given email addresses having this domain name (e.g., user@company.com).

In order to translate a domain name into its corresponding IP addresses, a Domain Name Service ("DNS") must be utilized. The DNS includes a system of servers (referred to as DNS servers or name servers) that maintain a database for resolving domain names and IP addresses. For example, an attempt to access "www.company.com" may be directed by the DNS to the IP address 12.10.38.33. This conversion allows users to connect to remote computers by inputting domain names instead of IP addresses. Many types of information can be stored in a DNS record, and DNS provides physical locations (i.e., IP addresses) associated with each domain name. Further, the DNS records may list the mail exchange servers and instant messaging servers for each domain. In sum, DNS facilitates access to information and services associated with a given domain name by providing the IP addresses of devices providing such domain services.

Domain names are often company trademarks, personal names or short phrases concatenated with an extension (e.g., .com, .net, org, us, .biz, etc.). For example, businesses and other entities often obtain custom domain names incorporating their trademarks. Individuals may also obtain custom domains (e.g., johnsmith.com). To obtain ownership and control over an Internet domain name, users must interact with a registry accredited by the Internet Corporation for Assigned Names & Numbers (ICANN). If a requested domain name is available, the user may purchase the name and may proceed, for example, in creating a web site or setting up domain e-mail.

As part of this domain set-up, the user must specify the IP addresses or host names associated with the domain for publishing in the domain's DNS record. As previously mentioned, the DNS record lists IP addresses associated with various services offered by the domain. Alternately, the DNS record may list host names for the services. For example, a DNS record may include a Mail eXchange record (also referred to as a MX record). The MX record maps a domain name to a list of mail exchange servers for that domain. Similarly, a Session Initiation Protocol (SIP) related-record may map to services such as instant messaging services for a domain. As known to those skilled in the art, SIP related DNS records may include SRV and NAPTR records. A DNS record may include an entry for a web page/web site for the domain (also known as an ARecord). A DNS entry may also include a Text record where any arbitrary text may be placed. Importantly, the DNS record associated with a domain name, while accessible to the public, generally is only editable at the direction of the entity in control of the domain (e.g., the domain owner).

Though a domain owner may control the various IP addresses/host names listed in a DNS record, the owner need not control the devices residing at these addresses. For example, a domain owner may outsource the hosting of web pages within the domain. In this example, network-hosting services may be provided by a third party who owns a server connected to the Internet. The server may provide a web site having the domain name, and the domain's DNS record may point requests for this web site to the third party's server. By allowing a third party to host web pages for the domain, the domain owner need not incur the costs of server ownership, setup and initiation.

While outsourcing of network-services is well known in the art, there are currently inadequate techniques in which a domain owner may capitalize on their domain ownership when services are hosted. For example, domain owners today typically must pay hosting services for outsourcing of network services. The hosting fees traditionally cover expenses such as server maintenance and service set-up costs. In this example, the domain owner is essentially "renting" server space. To recoup the hosting fees, the domain owner may seek to generate revenue by, for example, selling goods on their web site, selling advertisements on a web site or by charging users to use the domain services. These revenue-generating activities may be burdensome, infeasible or undesirable for a domain owner. For example, a small non-profit organization may not want to charge for access, may have nothing to sell and may not receive enough web traffic for advertisements to be a feasible revenue source. Accordingly, if the small organization wished to provide a web site or to provide its members email and instant messaging services, the organization may not be able to afford these services. As will be appreciated by those skilled in the art, a large number of domain owners may find it difficult to generate revenue from their domain, and these owners may not be able to afford the costs associated with outsourcing the hosting of various network-based services.

SUMMARY

The present invention meets the above needs and overcomes one or more deficiencies in the prior art by providing a system and method for hosting network-based services for a domain name. In one embodiment, authorization to host network-based services for the domain name is obtained. These network-based services may include web hosting, instant messaging and email services. The authorization may originate from an entity in control of the domain such as the domain owner. The authorized network-based services are provided to users of the domain in interfaces that present advertising content to the users. Advertising revenue is generated in connection with this presentation of advertising content, and a portion of the advertising revenue is allocated for distribution to the entity in control of the domain. It should be noted that this Summary is provided to generally introduce the reader to one or more select concepts in a simplified form that are described below in the Detailed Description. This Summary is not intended to identify key and/or required features of the claimed subject matter, nor is it intended to be used as an aid in determining the scope of the claimed subject matter.

BRIEF DESCRIPTION OF THE SEVERAL VIEWS OF THE DRAWINGS

The present invention is described in detail below with reference to the attached drawing figures, wherein.

DETAILED DESCRIPTION

The subject matter of the present invention is described with specificity to meet statutory requirements. However, the description itself is not intended to limit the scope of this patent. Rather, the inventor has contemplated that the claimed subject matter might also be embodied in other ways, to include different steps or combinations of steps similar to the ones described in this document, in conjunction with other present or future technologies. Moreover, although the term "step" may be used herein to connote different elements of methods employed, the term should not be interpreted as implying any particular order among or between various steps herein disclosed unless and except when the order of individual steps is explicitly described. Further, the present invention is described in detail below with reference to the attached drawing figures, which are incorporated in their entirety by reference herein.

The present invention provides improved systems and methods for initiating network hosting services. The invention may be described in the general context of computer-executable instructions, such as program modules, being executed by a computer. Generally, program modules include routines, programs, objects, components, data structures, etc., that perform particular tasks or implement particular abstract data types. Moreover, those skilled in the art will appreciate that the invention may be practiced with a variety of computer-system configurations, including hand-held devices, multiprocessor systems, microprocessor-based or programmable-consumer electronics, minicomputers, mainframe computers, and the like. Any number of computer-systems and computer networks are acceptable for use with the present invention. The invention may be practiced in distributed-computing environments where tasks are performed by remote-processing devices that are linked through a communications network. In a distributed-computing environment, program modules may be located in both local and remote computer-storage media including memory storage devices. The computer-useable instructions form an interface to allow a computer to react according to a source of input. The instructions cooperate with other code segments to initiate a variety of tasks in response to data received in conjunction with the source of the received data.

Figure 1:
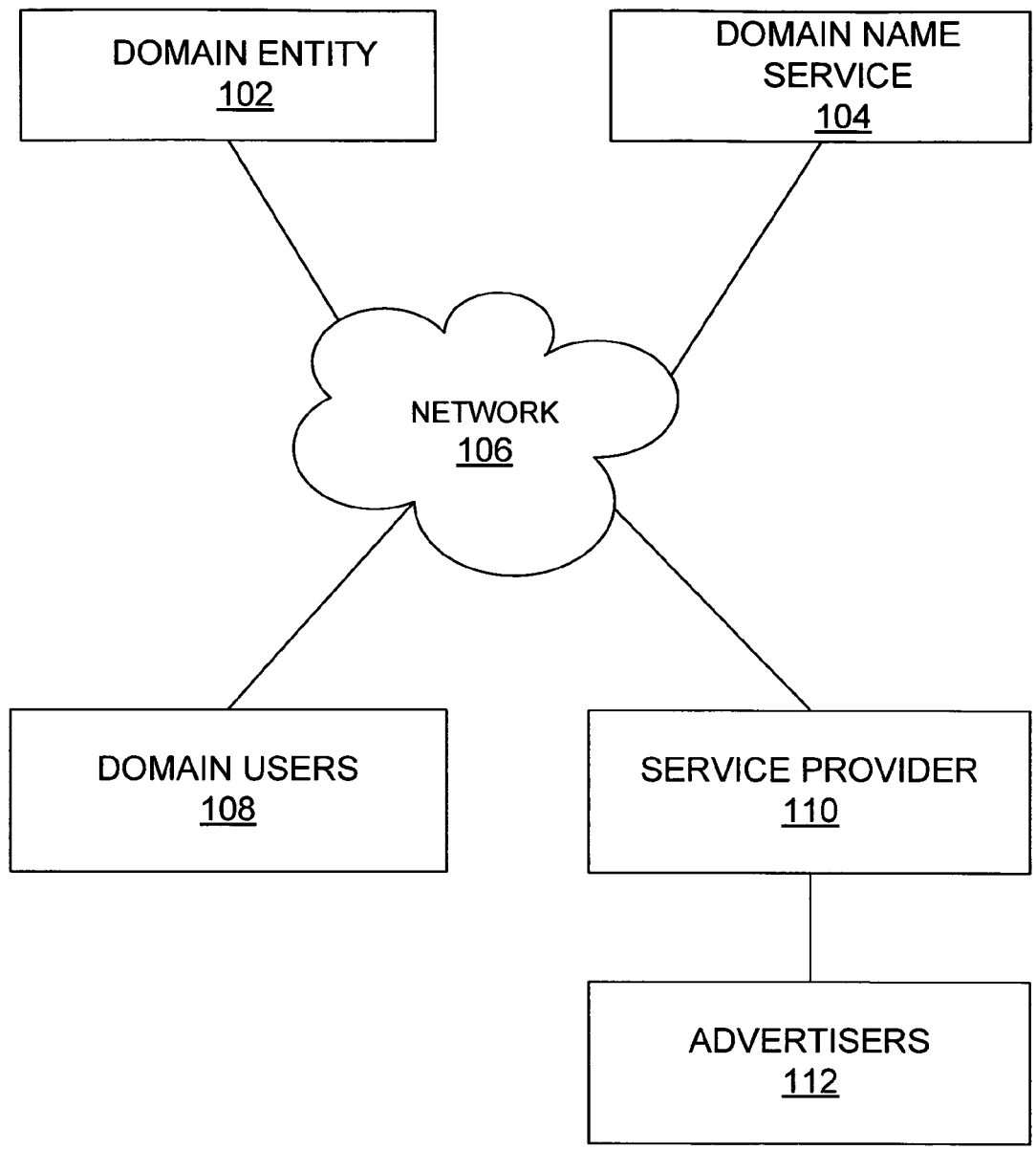
FIG. 1 is a block diagram of a computing environment suitable for use in implementing the present invention.

FIG. 1 illustrates a system 100 that represents an exemplary environment in which the present invention may be practiced. The system 100 includes a domain entity 102. The domain entity 102 may be any person or organization having control over a domain name. For example, the domain entity 102 may have purchased "johnsmith.com" from an ICANN accredited registry. Each person or organization in control of the domain name may comprise the domain entity 102.

The system 100 also includes a domain name service 104 ("DNS 104"). The DNS 104 includes a listing of IP addresses and other information associated with the domain name controlled by the domain entity 102. For example, the DNS 104 may include an IP address or host name associated with email, instant messaging services and/or web-hosting services. The DNS 104 allows domain users 108 to access the services associated with the domain name over the network 106. The network 106 may be any network, such as the Internet. In operation, when a request from one of the domain users 108 is received over the network 106, the DNS 104 is configured to route this request to an appropriate device. For example, a request from one of the domain users 108 may seek to access content at www.johnsmith.com. This request will be translated by the DNS 104 into an IP address associated with a server hosting a web site for www.johnsmith.com. While any number of organizations may provide DNS services, only the domain entity 102 may control the DNS record associated with its domain name.

A service provider 110 is also included in the system 100. The service provider 110 may provide any number of network services associated with the domain name controlled by the domain entity 102. For example, the service provider 110 may provide email, instant messaging or network hosting services. In one embodiment, the service provider 110 maintains a server on the network 106 that provides the services, and the DNS record maintained by the DNS 104 includes the IP address associated with this server. The service provider 110 may provide email services for accounts having the domain name johnsmith.com. When an incoming email is sent to user@johnsmith.com, this email may be directed to the IP address associated with the service provider 110 and indicated by the DNS 104. Accordingly, the service provider 110 will receive the email and can provide email access for the account user@johnsmith.com. Such email access may be provided in any number of interfaces. For example, the access may be provided in a network-based interface accessible over the network 106. As will be appreciated by those skilled in the art, by pointing the DNS records associated with a domain name to instrumentality controlled by the service provider 110, the service provider 110 is enabled to host any number of services and operations in connection with a domain name.

The system 100 also includes advertisers 112. As the service provider 110 may display various content to the domain users 108, this displayed content may include advertising content associated with the advertisers 112. For example, the service provider 110 may provide email access in a network-based interface. The interface may include various advertisements for the domains users 108 to view and interact with while accessing their email. Those skilled in the art will recognize that any number of techniques exist in the art to display advertisements to users. The advertisers 112 may pay the service provider 110 for the presentation of the advertising content. In some embodiments, hosting services may be provided free of charge, while expenses associated with such services are covered by advertising revenue.

Figure 2:
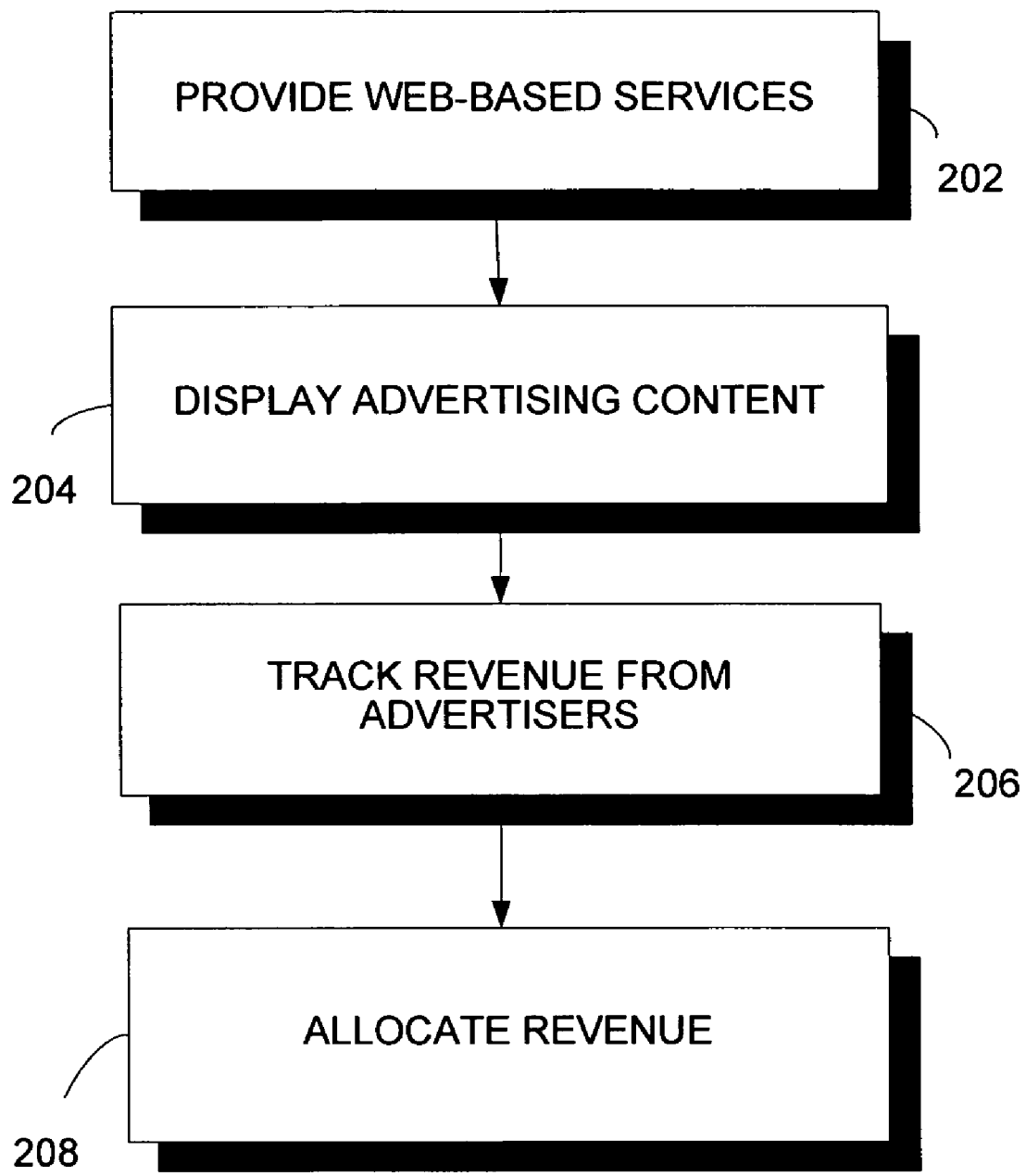
FIG. 2 is a flow diagram showing a method for offering network-based services for user accounts in accordance with an embodiment of the present invention.

FIG. 2 provides a method 200 for offering network-based services for user accounts. At 202, the method 200 provides network-based services to users having accounts associated with a domain name. Any number of network-based services may be provided for a domain name. These services include email, instant messaging and web hosting services. To initiate these services, the domain owner must sign-up for the hosting services and must properly configure the DNS record associated with their domain. As will be appreciated by those skilled in the art, the requested services may be presented in a variety of interfaces, and any number of presentation techniques may be acceptable for providing the services to the domain users. In one embodiment, the owner of the domain name may submit a hosting request to an outsourcing entity. For example, the owner of "johnsmith.com" may submit a request for email and instant message hosting services for users of his domain. Responsive to this request, users of johnsmith.com (e.g., john@johnsmith.com) may be granted access to the services hosted by the outsourcing entity. In this example, a user may send and receive emails and instant messages from their johnsmith.com account in an interface provided by the outsourcing entity.

The method 200, at 204, displays advertising content to the users. The advertising content may be displayed in any number of different ways. The advertisements may be presented along with other content or may reside in dedicated screen areas. Further, the ads may be appended to communications to or from the user accounts. Any sort of advertising content may be presented, including video and audio advertisements. As will be appreciated by those skilled in the art, the present invention is not limited to any type or presentation of advertising content.

At 206, the method 200 tracks advertising revenue generated in connection with displaying the advertising content. This content may be displayed in an interface to domain users or may be displayed on a hosted web site associated with the domain. As previously mentioned, advertisers typically pay for the presentation of their content to users. In fact, advertisers and service providers may enter into a variety of agreements related to the presentation of ads to users. An advertiser may be charged a flat fee, or the fee may vary based on the number of times an advertisement is shown. Fees may also be incurred based on user engagement with the advertising content. For example, the advertiser may pay a certain amount each time a user selects to view more information about an advertised product. A variety of tracking techniques may be employed to determine the amount of revenue generated by displaying advertisements to users of a domain. For example, a service provider may be paid one cent each time a certain ad is presented to a user. If users having johnsmith.com accounts are shown this advertisement 1000 times during a month, then ten dollars of advertising revenue can be tracked to johnsmith.com. As will be appreciated by those skilled in the art, a variety of different accounting techniques may be utilized to track the advertising revenue associated with a domain name, and these techniques may vary based on the agreements and relationships between the advertisers and the service provider.

At 208, the method 200 allocates a portion of the advertising revenue for distribution to the owner of the domain name. For example, the domain owner and the service provider may have an agreement that half the advertising revenue generated by the domain name must be allocated to the domain owner. In this example, half the revenue tracked to the domain name at 206 must be distributed to the domain owner. As will be appreciated by those skilled in the art, by allocating a portion of the advertising revenue to the domain owner, the service provider may increase the number of users accessing the network-based services and may also increase the total revenue generated from advertisers.

Figure 3:
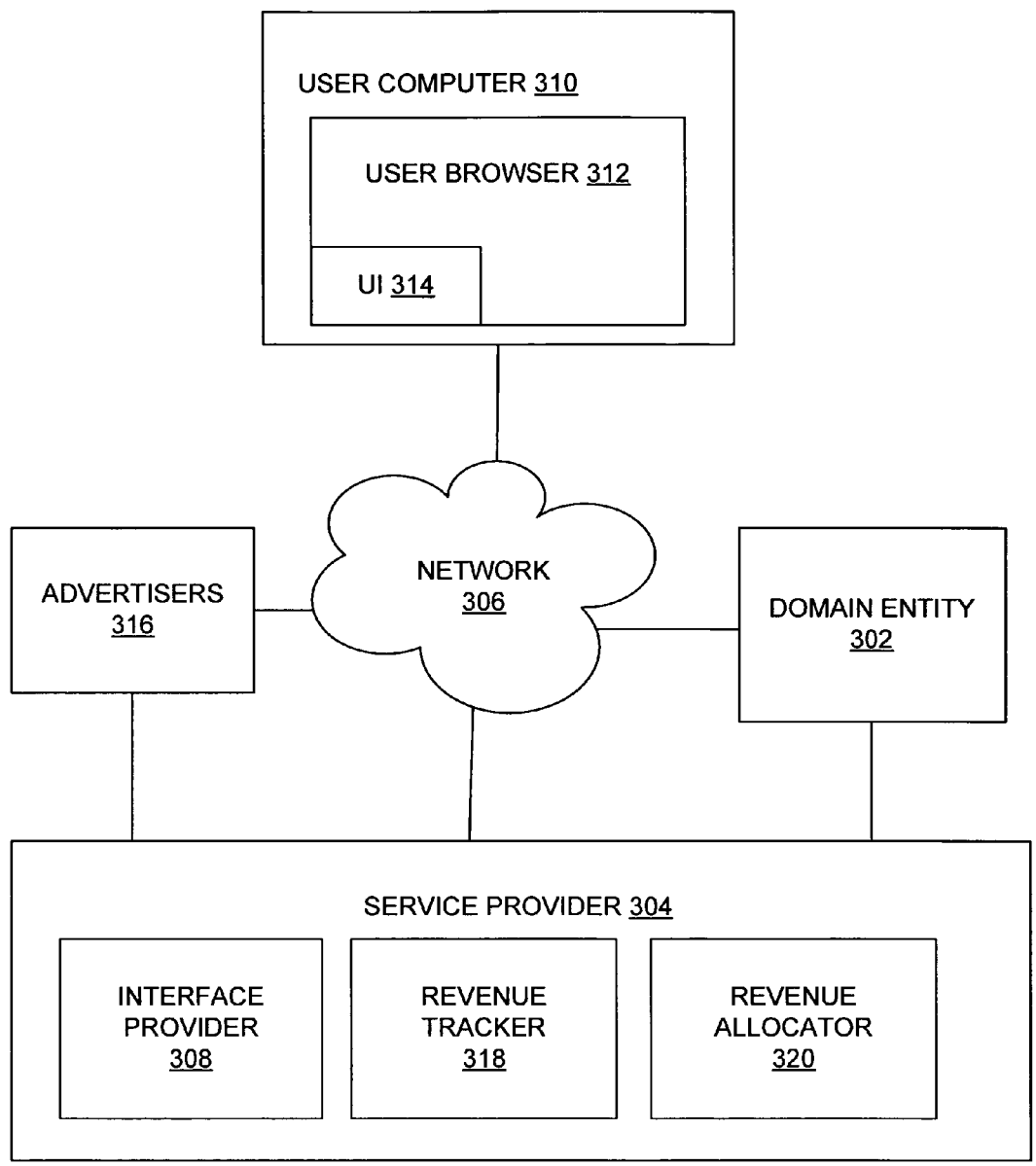
FIG. 3 is a block diagram of a system for providing network-based services for a domain name in accordance with an embodiment of the present invention.

FIG. 3 illustrates a system 300 for providing network-based services for a domain name. The system 300 includes a domain entity 302. The domain entity may be any person or organization having control or ownership of a domain name. For example, the domain entity 302 may have purchased the domain name "johnsmith.com" from an ICANN accredited registry.

The system 300 also includes a service provider 304 configured to provide network-based services for a domain name controlled by the domain entity 302. For example, the domain entity 302 may request a variety of services be provided by the service provider 304. This request may be transmitted over the network 306 or via another communication channel. Responsive to this request, a number of operations may be performed by the service provider 304. For example, the service provider 304 may verify that the domain entity 302 is in control of the domain name. In one embodiment, the service provider 304 presents an interface with a set of terms and conditions associated with hosting the network-based services. In this embodiment, the domain entity 302 must indicate assent to these terms and conditions before the service provider 304 will initiate the requested services. In another embodiment, the service provider 304 provides an IP address and/or an authorization code to be entered in the DNS record associated with the domain name. In this example, the domain owner edits the DNS record associated with the requested services, while the service provider 304 provides these services.

The service provider 304 includes an interface provider 308. The interface provider 308 may provide the network-based services in one or more interfaces. For example, users of johnsmith.com may be permitted to log into a network-based portal to utilize email services. The email services may be presented in an interface tailored for users of johnsmith.com or may be presented in a generic interface used for multiple domains. In one embodiment, the interface provider 308 permits network-based access to services over the network 306. A user computer 310 having a user browser 312 accessible through a user interface (UI) 314 may attempt to access the provided services. The user computer 310 may be connected over the network 306 to the service provider 304. In operation, the user submits log-in credentials through the user browser 312 and receives the service interface on the browser 312 as well. As another example, users of johnsmith.com may be permitted to transfer files for web hosting or to run web tools for modifying behavior of a web site. As will be appreciated by those skilled in the art, these interfaces may be varied and service dependent.

For end users interacting with the service, a variety of content may be displayed on the interfaces provided by the interface provider 308. For example, advertising content may be presented to the domain users as they utilize the services. Advertisers 316 are included in the system 300, and these advertisers 316 may pay the service provider 304 for this display of advertising content. As will be appreciated by those skilled in the art, any number of presentation techniques may be utilized to display the advertising content. Further, the advertising content may be tailored to the users of a domain name. For example, the service provider 304 may provide email and instant messaging services for a university with the domain name "cityuniversity.edu." The advertisers 316 may select advertisements directed to students of this university, and, when a students signs in, the interface provider 308 will display the selected advertisements to the students.

The service provider 304 also includes a revenue tracker 318 configured to compile information indicating the advertising revenue generated from users of a domain name. For example, the advertisers 316 may pay the service provider 304 a certain sum of money each time a user interacts with a piece of advertising content. The revenue tracker 318 may observe each such user interaction and note the user's domain name. For example, users of johnsmith.com may be responsible for one-third of the interactions with a piece of advertising content during a given time period. Accordingly, the revenue tracker 318 may indicate that one-third of the revenue associated with this content is attributable to the johnsmith.com domain. As will be appreciated by those skilled in the art, the revenue tracker 318 may utilize any number of techniques to track the revenue attributable to users of a domain name.

A revenue allocator 320 is also included in the service provider 304. The revenue allocator 320 is configured to allocate a portion of the advertising revenue to the domain entity 302. The tracking information from the revenue tracker 318 may be utilized in this allocation. For example, the domain entity 302 may be owed a percentage of the revenue generated from its domain name, and the revenue allocator 320 may compute the amount of this owed-revenue. As will be appreciated by those skilled in the art, by receiving a portion of the advertising revenue, the domain entity 302 may recognize income from it domain name without incurring the expense of providing services or interacting with the advertisers 316. The revenue allocator 320 may also allocate a portion of the advertising revenue to various third-parties. For example, an organization or consultant may sell domains or encourage new domain owners to enroll in the services provided by the system 300. In return for bringing in additional domains, the organization or consultant may be allocated a portion of the generated revenue.

Figure 4:
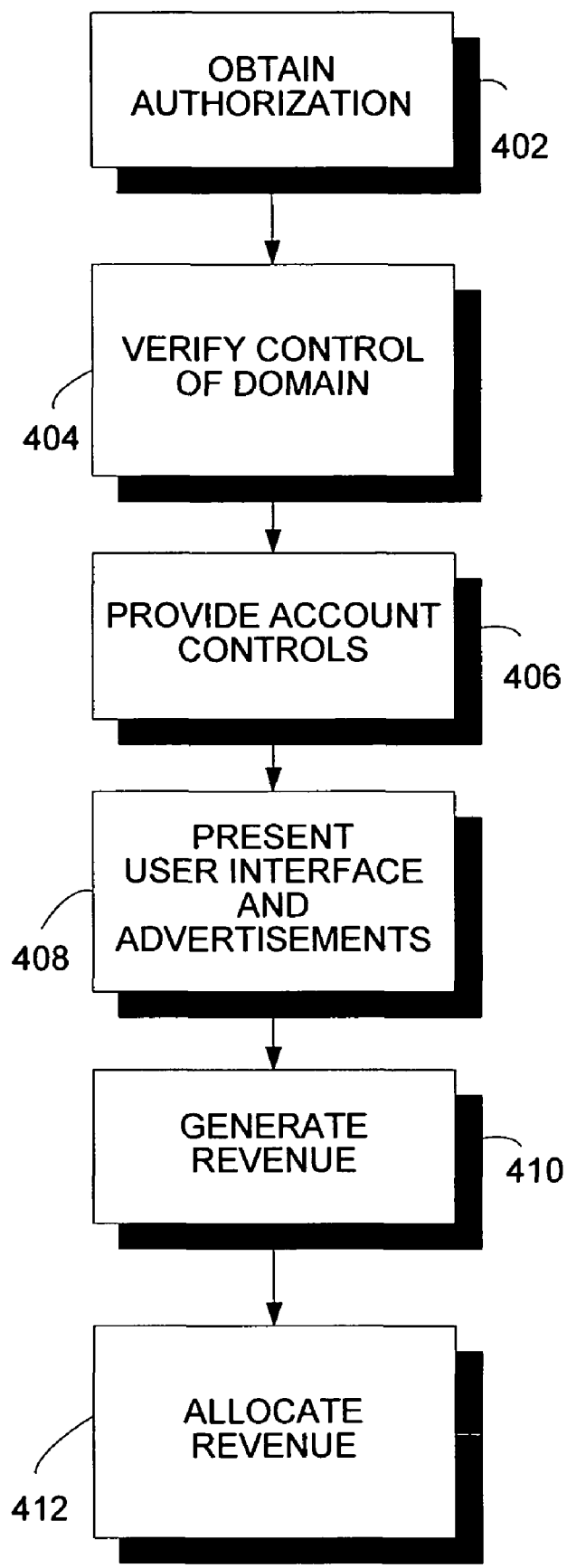
FIG. 4 is a flow diagram showing a method for offering network-based services for user accounts having a domain name in accordance with an embodiment of the present invention.

FIG. 4 provides a method 400 for offering network-based services for user accounts. At 402, the method 400 obtains authorization to host one or more services for a domain name. For example, a hosting entity may be given permission to provide email accounts having the domain "randomdomain.com." The authorization may be received via any number of communication channels and may originate from a variety of entities.

The method 400, at 404, verifies that the authorization originates from an entity entitled to provide such permission. For example, the method 400 may seek to verify that the authorization comes from the domain owner or other entity in control of the domain name. Any number of techniques may be utilized to determine whether the authorizing entity is in control of the domain name. For example, the authorizing entity may be securely provided an authorization code, along with instruction to publish this code in a location associated with the domain name, such as in the domain's DNS record. Later, the DNS record may be checked for the authorization code. If the authorization code exists in the DNS record, it may be concluded that the authorizing entity is, in fact, an entity in control of the domain name. As will be appreciated by those skilled in the art, because only the domain owner is able to edit the DNS record, the existence of the authorization code in the DNS record demonstrates ownership/control of the domain name by the requester. Other techniques exist in the art for verifying ownership/control over a domain name. For example, instead of an authorization code, the domain owner may be given a unique IP address to enter in the domain's DNS record. As domain control may change over time, the verification process may be periodically repeated. Also, when domains have multiple owners, it may be desirable to verify the ownership of each entity. For example, each owner may be provided a different code for publishing in a DNS record. If one of these codes is removed from the DNS, the method 400 may no longer recognized the entity associated with the missing code as an owner. As will be appreciated by those skilled in the art, any number of ownership/control validations may be utilized by the present invention, and numerous policies may be implemented to track the control of a domain name.

At 406, the method 400 provides account controls for creating and managing user accounts having the domain name. In one embodiment, the authorizing entity may log-into the service provider to manage the services. The authorizing entity may be provided a variety of different service options, and a portion of these options may relate to administrative controls maintained by the entity over the hosted accounts. In one embodiment, the authorizing entity (or other entity designated as an administrator) may be provided a set of account management controls. For email and instant messaging services, the administrator may enter account information and manage accounts having the domain name. Such account management may also be appropriate for managing users of restricted access web sites hosted by the service provider. For example, the domain owner may create and enter information for the accounts user1@domain-name.com and user2@domain-name.com. The account information may include a variety of information about the users. For example, the account information may indicate a user's email address, name, contact information and password. Once the account information is received, a variety of account maintenance operations may be performed. For example, inboxes may be created to handle messages directed to user accounts. Further, a set of policies and administrative options may be associated with each account. It should be noted that the account information may be received via a user interface or may be imported from a file or data store. Also, in some embodiments, the authorizing entity may forgo administrative controls over the accounts and allow anyone to sign-up for and use email accounts having their domain name.

The method 400, at 408, presents one or more user interfaces to the domain users. These user interfaces may provide the hosted network-based services, though any type of content may be presented to the users. The user interfaces may display advertising content to the users. This advertising content may be displayed in a variety of ways and may take on any number of different formats.

At 410, the method 400 generates revenue in connection with the displayed advertising content. As previously mentioned, network-based content providers and advertisers typically enter into agreements concerning the presentation of advertising content to users. Under these agreements, the content providers may receive revenue from the advertisers related to presentation of the advertisements.

At 412, the method 400 allocates a portion of the advertising revenue for distribution to the owner of the domain name. The service provider and the domain owner may enter into an agreement detailing how the advertising revenue may be allocated to the domain owner. For example, the parties may agree to split any revenue generated in connection with presenting advertisements to users of the domain name. In one embodiment, an automated tool may be implemented to allocate a portion of the advertising revenue to the domain owner. As will be appreciated by those skilled in the art, any number of computer-implemented processes may aid in allocating the advertising revenue and in distributing revenue to the domain owner.

Alternative embodiments and implementations of the present invention will become apparent to those skilled in the art to which it pertains upon review of the specification, including the drawing figures. Accordingly, the scope of the present invention is defined by the appended claims rather than the foregoing description.

The invention claimed is:

1. A computer-implemented method for hosting network-based services for a domain name, said method comprising:
    obtaining a request to host one or more network-based services for said domain name, wherein said request is obtained from an entity purporting to be authorized to control said domain name;
    providing an authorization code to said entity in response to said request, wherein said authorization code is to be published by said entity in a Domain Name System (DNS) record associated with said domain name so as to demonstrate control of said domain name through the ability to modify said DNS record;
    verifying that said entity is authorized to control said domain name, wherein said verifying includes determining whether said authorization code was published by said entity in said DNS record associated with said domain name;
    incident to verifying that said entity is authorized to control said domain name, providing said one or more network-based services in one or more user interfaces, wherein at least a portion of said one or more user interfaces present advertising content to users;
    generating advertising revenue in connection with the presentation of said advertising content; and
    allocating at least a portion of said advertising revenue to said entity.

2. The method of claim 1, wherein said one or more network-based services is an email service.

3. The method of claim 1, wherein said one or more network-based services is an instant messaging service.

4. The method of claim 1, further comprising tracking usage of said one or more user interfaces.

5. The method of claim 4, further comprising utilizing said tracking to allocate at least a portion of said advertising revenue to said entity.

6. One or more computer-storage media having computer-useable instructions embodied thereon to perform the method of claim 1.

7. A computer-system, including one or more processors, for providing network-based services for a domain name, said system comprising:
    an authorization component configured to obtain a request to host one or more network-based services for said domain name, wherein said request is obtained from an entity purporting to be authorized to control said domain name;
    an output component that provides at least one authorization code to said entity in response to said request, wherein said authorization code is to be published by said entity in a Domain Name System (DNS) record associated with said domain name so as to demonstrate control of said domain name through the ability to modify said DNS record;
    a notification component that indicates to said entity when hosting has been established for one or more network based services, wherein said at least one service is established in response to verifying that said entity published said authorization code in said DNS record;
    a service interface component configured to provide, via said one or more processors, said one or more network-based services to users in one or more user interfaces, wherein at least a portion of said one or more user interfaces present advertising content to the users;
    a revenue tracking component configured to compile tracking information indicating a level of advertising revenue generated in connection with the presentation of said advertising content; and
    a revenue allocation component configured to utilize said tracking information to allocate at least a portion of said advertising revenue to said entity.

8. The system of claim 7, wherein said one or more network-based services is at least one of an email service and an instant messaging service.

9. The system of claim 7, wherein said one or more network-based services is a web site hosting service.

10. The system of claim 7, wherein said authorization component is further configured to verify that said entity is authorized to control said domain name.

11. The system of claim 7, further comprising an interface configured to present said entity a set of terms or conditions associated with hosting said one or more network based services.

12. The system of claim 11, wherein said interface is further configured to receive an input from said entity indicating assent to said set of terms or conditions.

13. The system of claim 7, wherein said advertising revenue allocated to said entity is a function of said level of advertising revenue.

14. One or more computer-storage media having computer-useable instructions embodied thereon to perform a method for offering network-based services for user accounts associated with a domain name, said method comprising:
    obtaining a request to host one or more network-based services for said domain name, wherein said request is obtained from an entity purporting to be authorized to control said domain name;
    providing an authorization code to said entity in response to said request, wherein said authorization code is to be published by said entity in a Domain Name System (DNS) record associated with said domain name so as to demonstrate control of said domain name through the ability to modify said DNS record;
    observing said DNS Record associated with said domain name;
    comparing said DNS Record with said authorization code;
    incident to verifying that said entity published said authorization code in said DNS record, providing one or more network-based services for one or more users having one or more accounts associated with said domain name;
    displaying advertising content to said users;
    tracking advertising revenue generated in connection with said displaying of said advertising content to said one or more users; and
    allocating at least a portion of said advertising revenue to an entity associated with said domain name.

15. The media of claim 14, wherein said providing said one or more network based services includes presenting one or more user interfaces to the user over a network.

16. The media of claim 14, wherein said method further comprises providing said entity controls for administrating at least a portion of said one or more accounts associated with said domain name.

17. The media of claim 14, wherein said one or more network-based services includes at least one of an email service or an instant messaging service.

18. The media of claim 14, further comprising distributing at least a portion of said advertising revenue to said entity.

* * * * *